UNITED STATES PATENT OFFICE.

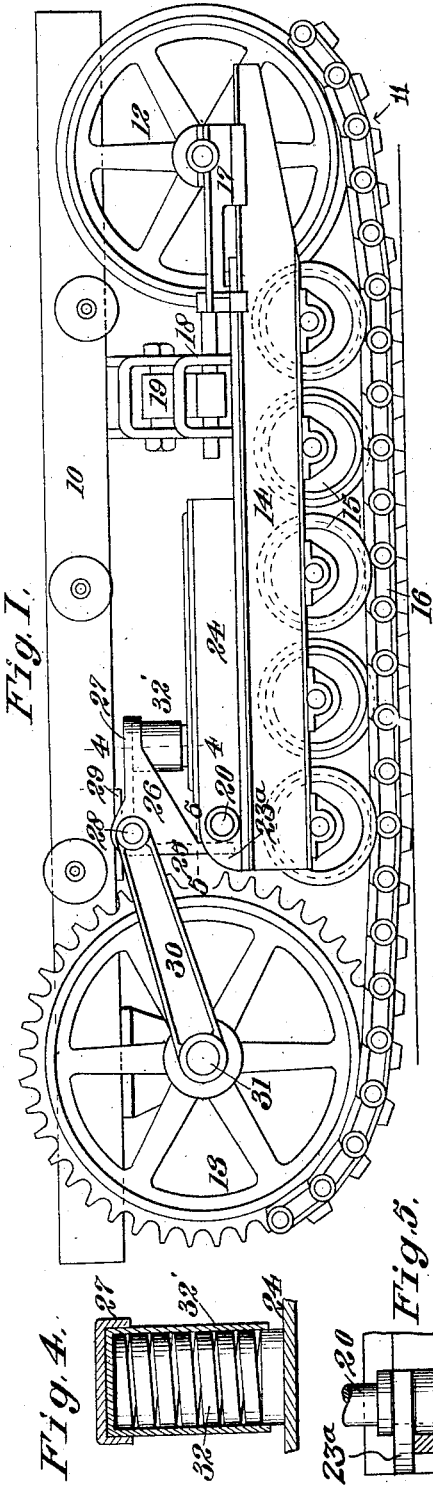

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRUCK-COMPENSATING MECHANISM.

1,407,970.        Specification of Letters Patent.     Patented Feb. 28, 1922.

Application filed February 6, 1919. Serial No. 275,345.

*To all whom it may concern:*

Be it known that I, ELMER E. WICKERSHAM, a citizen of the United States, residing at Stockton, in the county of San Joaquin and State of California, have invented new and useful Improvements in Truck-Compensating Mechanism, of which the following is a specification.

This invention relates to a frame suspension for motor vehicles and particularly pertains to vehicles of the self-laying chain track type.

Occasional difficulty has been experienced in the operation of chain track tractors, due to the accumulation of mud and dirt between the sprockets and the track links and treads, thereby producing strains which will result in the breaking of the chain track or distortion of the structure unless some means are provided for allowing for a sufficient amount of yield between the sprockets and the track. In co-pending case, Ser. No. 164,945, filed April 27, 1917, one method of overcoming this difficulty is shown.

The present invention has to do with another and different mode of accomplishing the desired result, with the added advantage that the same means which provides for relative compensation between the truck and the drive sprocket to permit the relative lengthening or shortening of the chain also forms the cushioning and supporting connection between the main frame and the truck.

It is also an object of the present invention to so design the compensating elements as to produce a constant desirable tightness of the chain and at the same time maintain the load supporting trucks of the vehicle in parallel alignment, irrespective of their movement. It is to be further noted that the members for producing the temporary retrograde movement of the trucks act to hold the trucks in equilibrium, due to the weight of the main frame and its load, and without being dependent upon spring actions. Other objects will appear hereinafter.

In the drawings, Fig. 1 is a fragmentary view in side elevation, illustrating a truck and its connections with the main frame.

Fig. 2 is an enlarged fragmentary view in plan, illustrating the driving sprocket of the truck and the compensating member.

Fig. 3 is a view in end elevation, disclosing the truck frame and its rear connection with the main frame.

Fig. 4 is a view in vertical section and elevation, as seen on the line 4—4 of Fig. 1.

Fig. 5 is a view in section and elevation, as seen on the line 5—5 of Fig. 1.

In the drawings, 10 indicates a main frame of any preferred design. At the opposite sides of this main frame are disposed self-laying truck units 11. These units consist of front idler wheels 12, rear driving sprockets 13, truck frames 14, and load supporting rollers 15, all of which members are embraced by a chain tread track 16. The load supporting rollers normally rest upon the lower run of the track and are held in spaced relation to each other by bearings disposed along the under side of truck frames 14. The forward end of the truck frame is provided with bearings 17 for supporting the axle of the idler 12. Directly in the rear of these bearings are connections 18, to which the outer ends of an equalizer bar 19 are pivoted. The center of this equalizer bar is pivoted to the main frame and this provides a desired amount of vibration between the forward ends of the truck frames and the main frames and equalizes the movement of the main frame in relation to the movement of the truck frames.

The rear ends of the truck frames are pivotally mounted upon a stabilizer shaft 20 which extends transversely of the main frame therebeneath. This shaft is fitted with inner and outer spacing collars 21 and 22, adapted to hold the trucks against longitudinal movement along the shaft. A suitable bearing 23 is mounted upon the rear end of each of the truck frames and it is through this bearing that the shaft extends. The bearing may be formed as a single simple unit or be made a part of an oil reservoir casting 24, the function of this casting being set forth in detail in a co-pending application entitled "Oiling system for tractor trucks," Ser. No. 273,741, filed Jan. 29, 1919. The rear face of each of the bearings 23 is provided with spaced flanges 23ª. Between these flanges a downwardly extending leg 25 of a compensating member 26 can rest. The portion 25 is bifurcated, as shown in Fig. 3, each leg being formed with an elongated slot for receiving a pin 25'. These pins are secured in the member 23 and limit the downward movement of the truck. The member 26 is formed with a leg 27 at right angles to the leg 25 and extending forwardly in normal parallel relation to the truck frame. These two legs are suitably reenforced and tied together by webs. At the point of juncture, a bearing is formed, adapted to receive a transverse shaft 28. This shaft provides a support upon which compensating members 26 may be freely rotatable, it being understood that one of said compensating members is supplied each of the trucks.

A transverse shaft 28 is fastened to the main frame by means of brackets 29, thus making it possible for the compensating members to swing from a point constant in relation to the main frame. Outer extensions of the shaft 28 form pivots for thrust rods 30. These rods stand rearwardly and downwardly and are disposed over the outer ends of axle 31, upon which the sprockets 13 are carried. The axle 31 is fixed in relation to the main frame and is thus reenforced by means of the thrust rods which will resist the strains, due to excessive tension upon the track chain. The horizontal legs 27 of the compensating members are formed with tubular casings 32', into which helical springs 32 are disposed. The lower ends of these springs rest directly or indirectly upon the truck frames at points in advance of the stabilizer shaft 20.

In operation, the load carried by the main frame will be imparted to the trucks through the medium of the equalizer bar 19 and the compensating members 26, it being noted that under normal circumstances the downward force upon the transverse shaft 28 will cause the leg 27 of the compensating member to force downwardly upon its spring 32, at the same time causing the spring, in reality, to act as a fulcrum point and thus swinging the leg 25 inwardly against the back of the bearing 23. The resultant downward force exerted by the leg 27 and the forward force exerted by the leg 25 will in reality produce a couple, which will cause the compensating members to stand in equilibrium under normal conditions and to hold the rear ends of the truck units against vibration. In the event that the chain becomes excessively tight by the introduction or accumulation of dirt, or any foreign substance between the chain and driving or idler sprockets, it will be possible for the truck frames to move rearwardly, as permitted by the yield of the springs 32.

This rearward movement will not only be resisted by the direct compression of the springs, but also due to the fact that the face of the bearing 23 will act against the face of the leg 25 and tend to swing the compensating member 26 upon its pivot 28. The result will be that the trucks may collapse under undue strains but will tend to stand parallel and to absorb the road shocks imparted to the frame, irrespective of their disposition. The weight of the vehicle will also keep the chain tight, at the same time automatically preventing an excess of strain to be thrown thereon. It is further to be noted that the springs 32 are at all times enclosed. This insures that the springs will function properly and will not become filled with dirt, as under present conditions the coil springs of tractors are often broken, due to the packing of dirt therearound. It will thus be seen that the compensating mechanism here disclosed is quite simple in its construction and direct in operation and will act to allow a desirable collapsing of the trucks as well as to form a yieldable suspension means for the vehicle.

Having thus described my invention, what I claim and desire to secure by Letters Patent is—

1. In a vehicle, the combination of a main frame, a truck, a chain track embracing the truck, and a yielding load supporting connection between the truck and main frame, including a bell crank fulcruming on the main frame with one arm having vertical sliding movement with respect to one of said members and the other arm spring supported on the truck.

2. In a vehicle, the combination of a main frame, a truck at each side thereof, a chain track embracing each truck, an equalizer mechanism connecting the forward ends of opposite truck frames to each other and in turn centrally pivoted to the main frame, a pivot shaft extending through the rear ends of both the truck frames and bell crank members carried by the main frame and resting upon the rear ends of the truck frames in a manner to maintain said frames in parallel alignment and resilient means included in the connections for said bell crank members to permit fore and aft movement bodily and vertical movement pivotally and bodily.

3. In a vehicle, the combination of a main frame, a truck at each side thereof, a chain track embracing each truck, a shaft having its opposite ends rotatably held within bearings on the rear of opposite truck frames and free of the main frame, compensating members pivotally supported upon the main frame and adapted to bear against the rear ends of the truck frames, yieldable means interposed between said compensating members and the truck frames for normally maintaining the frames in horizontal alignment and parallel to each other and for permitting the truck frames to move bodily or pivotally in a vertical plane and equalizing means connecting the forward ends of the truck frames with the main frame.

4. In a tractor truck structure, a freely floating truck frame, yieldable means connecting said frame at its forward end with a tractor main frame, a compensating member freely pivoted upon the main frame and adapted to extend in the rear of the truck frame and to extend forwardly and overhang the same and a spring member interposed between said compensating member and the truck frame, whereby the frame will be normally held in parallel relation to the main frame and may be yieldably permitted to pivotally swing from its rear end or to move bodily in relation to the main frame.

5. In a tractor truck construction, a truck frame, yieldable means at its forward end connecting it with the tractor main frame, a bell crank compensating member pivotally mounted upon the main frame and extending with one leg in the rear of the truck frame and the other forwardly overhanging the same and a spring interposed between the forwardly overhanging leg of said bell crank and the truck frame, whereby a pressure exerted by the main frame will be initially imparted to the spring and thereafter indirectly imparted to the vertical leg of said member to cooperate in maintaining the truck in equilibrium, irrespective of the load placed thereupon and to permit the truck to have vertical pivotal and bodily movement.

In testimony whereof I have hereunto set my hand in the presence of two subscribing witnesses.

ELMER E. WICKERSHAM.

Witnesses:
 DAVID B. LYMAN,
 EDWARD E. BURTENBUCHER.